US006144543A

United States Patent [19]
Daoud et al.

[11] Patent Number: 6,144,543
[45] Date of Patent: Nov. 7, 2000

[54] GROUNDING DEVICE

[75] Inventors: Bassel Hage Daoud, Parsippany; Adam Stuart Kane, Morristown; Walter Pelosi, Randolph; Mikhail Sumetskiy, Bridgewater, all of N.J.

[73] Assignee: Lucent Technologies Inc., Murray Hill, N.J.

[21] Appl. No.: 09/338,957

[22] Filed: Jun. 24, 1999

[51] Int. Cl.[7] ........ H02H 3/22
[52] U.S. Cl. ........ 361/119; 361/111
[58] Field of Search ........ 361/91.1, 91.5, 361/111, 112, 117, 119, 120, 124, 126, 127

[56] References Cited

U.S. PATENT DOCUMENTS 4,074,337 2/1978 Debortoli et al. ........ 361/124
4,796,150 1/1989 Dickey et al. ........ 361/119
5,166,855 11/1992 Turner ........ 361/119

*Primary Examiner*—Ronald W. Leja

[57] ABSTRACT

A grounding device for interfacing telecommunications equipment connected through tip and ring conductors and an electronic module with a grounding path for discharging current surges and voltage spikes. The grounding mechanism includes a voltage discharge member mounted between the electronic module and a mounting base for discharging voltage spikes from the electronic module through a grounding path in the mounting base. A biasing member is provided for applying restorative displacement force to the electronic module in a direction opposite to the direction of a force applied to the electronic module by a voltage spike, to thereby ensure and maintain electrical contact between the electronic module and the discharge member.

8 Claims, 1 Drawing Sheet

GROUNDING DEVICE

BACKGROUND OF THE INVENTION

1. Field of the Invention The present invention pertains to protection devices for use with telecommunications equipment, and particularly to devices for protecting telecommunications equipment from potentially damaging current and voltage surges.

2. Description of the Related Art

Grounding mechanisms or devices are designed to protect telecommunications equipment from current surges and voltage surges by providing a grounding path in the event that either such event occurs. Grounding is necessary to prevent current and voltage surges from reaching and damaging fragile telecommunications equipment. Voltage surges typically result from lightening strikes which can generate voltages on the order of 20,000 volts.

A known solid state grounding mechanism or protector 10 is depicted in FIGS. 1 and 2. The grounding protector 10 serves as an interface between an electronic module 12 having one or more diodes for connecting a tip wire 14 and a ring wire 16 to ground to allow the discharge of damaging voltage and current surges. The protector 10 includes a pair of current sensors in the form of heat coils 18, 20, one for each of the tip and ring wires, respectively. The coils are mounted to a mounting base 32 and are biased in the downward direction relative to or toward the mounting base by tip spring 22 and ring spring 24. The heat coils 18 and 20 are maintained in an "up" or vertically offset position from the mounting base 32 by hardened solder formations 30.

A leaf spring 26 is partially contained within a sleeve 28 that is mounted to module 12. The leaf spring is horizontally off-set or displaced from the tip and ring heat coils 18, 20 and is in physical and electrical contact with a module or diode clip 29 for providing a grounding path from the module 12 through the base 32 for voltage surges.

In operation, and in the event of a current surge through, for example, the tip wire 14, the solder land 30 on tip heat coil 18 will melt, allowing heat coil 18 to be displaced downward under the urgency of spring 22 into abutment with base 32 and thereby connect to a common ground through base 32. Since the module 12 is connected to both the tip and ring heating coils 18, 20, the assembly will tilt slightly in a direction of the movement of the heat coil.

In the event of a voltage surge, the voltage arc resulting therefrom will extend from the diode clip 29 to the leaf spring 26 and be discharged to common ground through base 32. A problem that occurs, however, is that the voltage arc will generate a force that pushes against the leaf spring 26, in the direction shown by arrow 34, thereby deflecting and permanently bending the leaf spring 26 away from diode clip 29, i.e. out of physical and possible electrical contact with module 12. This result renders the prior art grounding mechanism unable to defend against any subsequently occurring voltage surges, leaving the delicate telecommunications equipment connected through module 12 particularly susceptible to damage from such subsequently occurring voltage surges.

SUMMARY OF THE INVENTION

The present invention provides an improved grounding device for protecting telecommunications equipment from damaging voltage spikes that occur, for example, as a result of lightening strikes. The grounding device includes a mounting base to which the tip and ring wires of a communications line are connected. The mounting base provides a grounding path for allowing the discharge of voltage spikes without causing damage to telecommunications equipment connected to the tip and ring wires. A pair of heat coils, one for each of the tip and ring wires, are provided. The heat coils are positionally biased in the direction of the mounting base by coil springs that operatively displace the heat coils to a grounding position against the mounting base in the event that a current surge is detected. A voltage discharge member is provided for interfacing an electronic module with the mounting base and with common ground. The electronic module is similarly biased by a biasing member in the downward direction relative to the discharge member and mounting base. In the event of a voltage surge, the biasing member ensures contact between the discharge member and the electronic module, thereby ensuring the existence and maintenance of a grounding path to allow discharge of the voltage surge and of subsequently occurring voltage surges.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
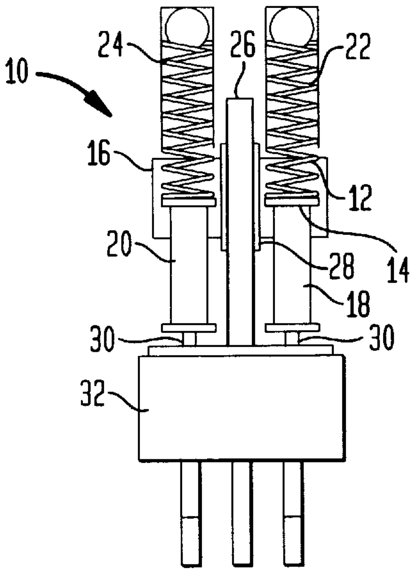
FIG. 1 (PRIOR ART)
FIG. 1 is a front face view of a prior art grounding device.
Figure 2:
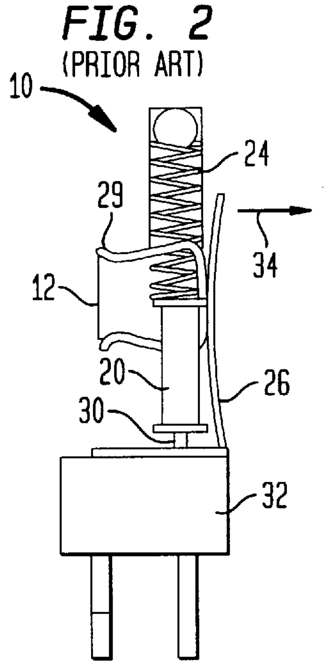
FIG. 2 (PRIOR ART)
FIG. 2 is a left-side view of the device of FIG. 1.
Figure 3:
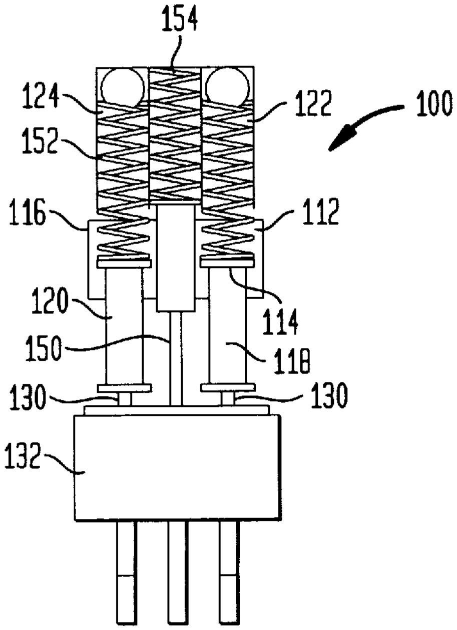
FIG. 3 is a front face view of a grounding device in accordance with the present invention.
Figure 4:
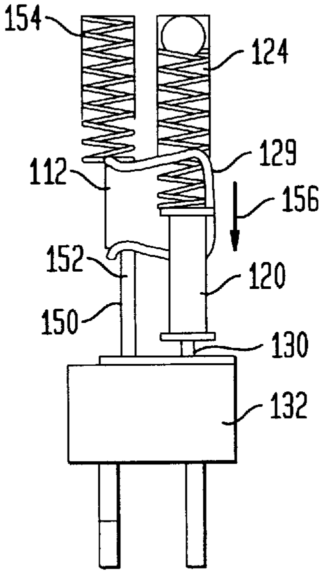
FIG. 4 is a left-side view of the grounding device of FIG. 3.

A grounding device 100 constructed in accordance with a currently preferred embodiment of the present invention is depicted in FIGS. 3 and 4. The grounding device 100 includes a mounting base 132 which, like the prior art mechanism 10 depicted in FIGS. 1 and 2 and discussed above, is configured as a 5-pin footprint connector so that it can be readily substituted for the prior art mechanism 10 without requiring modification to other interfacing and connector components. The mounting base 132 provides, among other things, a connection or path for electronic components mounted to the base to common ground for allowing the discharge of current surges and voltage spikes, common occurrences in the field of telecommunications technology.

A pair of conductors, namely a tip wire 114 and a ring wire 116, are connected to the grounding mechanism through separate terminals on an electronic module 112. Thus, the electronic module 112 has a tip terminal and a ring terminal for providing connections to tip wire 114 and ring wire 116, respectively. The module 112 provides an interface for telecommunications equipment connected to the tip and ring wires 114, 116, which equipment is susceptible to damage as a result of voltage spikes and current surges unintendedly applied to the tip and/or ring wires.

In order to protect telecommunications equipment from the effects of damaging current surges flowing through the tip and ring wires and the electronic module 112, current surge sensors are provided as in the form of a tip current surge sensor 118 and a ring current surge sensor 120. As in the prior art grounding mechanism 10, the current surge sensors 118 and 120 are maintained in a vertically offset position relative to the mounting base 132 by solder lands or formations 130 so that, under normal operation, the tip and ring conductors 114, 116 are displaced from and will not be grounded through base 132. Each current surge sensor has a biasing member connected thereto, such as tip coil spring 122 and ring coil spring 124. Each of the coil springs is connected at one end to a grounding mechanism housing (not shown) and at the other end to a respective one of the current surge sensors 118, 120. When a current surge occurs, as for example through the tip conductor 114 and through the tip terminal of the electronic module 112, the solder land 130 maintaining the vertically offset position of the tip current sensor 118 will melt as a result of the heat generated by the current surge flowing therethrough. When that occurs, the tip conductor coil spring 122 will force the tip current sensor to displace into electrical contact with a grounding contact on the mounting base 132 to provide a grounding path through base 132 for discharging of the current surge. The same situation occurs when a current surge is applied to ring conductor 116.

For protection against voltage surges, the leaf spring 26 employed in the prior art protector 10 is replaced with a voltage discharge member 150, preferably configured as a plunger pin having a pin base 152. The pin 150 is disposed in electrical contact with the electronic module 112 through contact with a module or diode clip 129 connected to the module for receiving voltage spikes applied to module 112. As shown in FIGS. 3 and 4, discharge pin 150 is connected at one end to mounting base 132 and its opposite end abuts a bottom portion of the module clip 129. A biasing member 154 configured, in the preferred embodiment, as a biasing spring is positioned at one end against a top portion of the module clip 129 and at the other end against or connected to the mechanism housing (not shown). As seen in FIG. 4, the voltage discharge pin 150 is mounted to base 132 in a horizontally offset position relative to the tip and ring current sensors 118, 120.

The biasing member or spring 154 may be constructed from any known durable conductive or non-conductive material. In the preferred embodiment, it is preferred that the biasing member be similar or identical to the springs 122 and 124 so that additional components need not be manufactured, e.g. the same springs used for biasing springs 122, 124.

The arrangement of voltage discharge pin 150 and electronic module 112 along with the offset position of the pin 150 from the tip and ring current sensors 118, 120 allow the module 112 to tilt, in the event of a current surge, in the direction of the terminal to which the current surge is applied without breaking contact with the voltage surge discharge pin 150. As for the interface between voltage discharge pin 150 and the electronic module clip 129, in the event of a voltage spike, such as from a lightening strike to equipment or conductors connected to mechanism 100, the force generated by the voltage spike may tend to move the module clip 129 vertically upward in a direction away from discharge pin 150, i.e. in the direction opposite to that delineated by arrow 156. When this occurs, there will be no voltage surge grounding path because the module clip 129 will not be electrically connected to pin 150 and to the grounding path through base 132. However, the biasing member or spring 154 will immediately urge or force the module clip 129 back down into contact with pin 150 and base 132, thereby ensuring that a grounding path is available. Moreover, by providing the pin 150 and biasing member 154 arrangement of the present invention and directing the force resulting from a voltage surge in a vertically upward direction relative to base 132 (i.e. in the direction opposite arrow 156), as opposed to in the outward direction denoted by arrow 34 in the prior art embodiment of FIG. 2, the position of pin 150 relative to module 112 and base 132 remains relatively constant. This further ensures that grounding protection for subsequent voltage surges or spikes likewise exists.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. It is the intention, therefore, to be limited only as indicated by the scope of the claims appended hereto.

We claim:

1. A grounding device for providing a grounding path for a voltage surge and for maintaining the grounding path for subsequent voltage surges, comprising:

a mounting base having a terminal connectable to electronic common ground for establishing a grounding path;

a tip conductor terminal;

a ring conductor terminal;

an electronic module connected to said tip terminal and said ring terminal;

a tip current surge sensor connected between said tip terminal and said mounting base for providing grounding of current surges between said tip terminal and said mounting base;

a ring current surge sensor connected between said ring terminal and said mounting base for providing grounding of current surges between said ring terminal and said mounting base;

a voltage surge discharge member connected between said electronic module and said mounting base for discharging the voltage surge through said grounding path, said electronic module being moveable between a first position in physical contact with said discharge member for connecting to the grounding path and thus allowing discharge of the voltage surge, and a second position spaced from the discharge member and the grounding path when the voltage surge occurs; and a biasing member for urging said electronic module from said second position to said first position in physical contact with said discharge member for providing discharge of the voltage surge and of subsequent voltage surges from said electronic module through the grounding path.

2. The grounding device of claim 1, wherein said biasing member is constructed of a conductive material.

3. The grounding device of claim 2, wherein said biasing member comprises a spring.

4. The grounding device of claim 1, wherein said tip current sensor is moveably secured in a spaced from the grounding path by a meltable solder land.

5. The grounding device of claim 4, wherein said ring current sensor is moveably secured in a position spaced from the grounding path by a meltable solder land.

6. The grounding device of claim 1, wherein said mounting base comprises a 5-pin footprint connector.

7. The grounding device of claim 1, wherein said biasing member is mounted to said mounting base at a position horizontally offset from each of said tip current sensor and said ring current sensor.

8. The grounding device of claim 1, wherein said voltage discharge member is configured as a pin.

* * * * *